US012807792B2

(12) United States Patent
Hasegawa

(10) Patent No.: US 12,807,792 B2
(45) Date of Patent: Nov. 24, 2026

(54) RUBBER ARTICLE AND TIRE INCLUDING SAME

(71) Applicant: BRIDGESTONE CORPORATION, Tokyo (JP)

(72) Inventor: Nao Hasegawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 170 days.

(21) Appl. No.: 18/857,177

(22) PCT Filed: Oct. 7, 2022

(86) PCT No.: PCT/JP2022/037631
§ 371 (c)(1),
(2) Date: Oct. 16, 2024

(87) PCT Pub. No.: WO2023/218678
PCT Pub. Date: Nov. 16, 2023

(65) Prior Publication Data

US 2025/0270391 A1 Aug. 28, 2025

(30) Foreign Application Priority Data

May 12, 2022 (JP) ................................ 2022-078662

(51) Int. Cl.
*C08L 9/00* (2006.01)
*B60C 1/00* (2006.01)
(Continued)

(52) U.S. Cl.
CPC .............. *C08L 9/00* (2013.01); *B60C 1/0025* (2013.01); *C08L 7/00* (2013.01);
(Continued)

(58) Field of Classification Search
CPC ....... C08L 9/00–9/10; C08L 7/00–7/02; B60C 1/0025; B60C 2001/0033
See application file for complete search history.

(56) References Cited

U.S. PATENT DOCUMENTS 10,131,772 B2 11/2018 Kondo
2007/0158007 A1 7/2007 Hochi
(Continued)

FOREIGN PATENT DOCUMENTS

CN 104311908 A 1/2015
JP H0762153 A 3/1995
(Continued)

OTHER PUBLICATIONS

Sep. 8, 2025, search result of the Extended European Search Report issued by the European Patent Office in the corresponding European Patent Application No. 22941754.8.
(Continued)

*Primary Examiner* — Prashant J Khatri
(74) *Attorney, Agent, or Firm* — KENJA IP LAW PC

(57) ABSTRACT

Provided are a rubber article that can achieve both excellent low heat generating property and anti-cut resistance simultaneously, and a tire including the rubber article. The rubber article is a vulcanizate of a rubber composition containing a rubber component and syndiotactic 1,2-polybutadiene, wherein the rubber component contains 30 mass % or more and 70 mass % or less of natural rubber and 30 mass % or more and 70 mass % or less of butadiene rubber, the proportion of the syndiotactic 1,2-polybutadiene is 5 parts by mass or more and 40 parts by mass or less per 100 parts by mass of the rubber component, and the thickness is 3 mm or more.

6 Claims, 1 Drawing Sheet

(51) Int. Cl.
*B60C 13/00* (2006.01)
*C08L 7/00* (2006.01)

(52) U.S. Cl.
CPC ... *B60C 2013/007* (2013.01); *C08L 2205/025* (2013.01); *C08L 2205/03* (2013.01)

(56) References Cited

U.S. PATENT DOCUMENTS

| | | | | |
|---|---|---|---|---|
| 2018/0057665 | A1* | 3/2018 | Miyazaki | C08J 3/223 |
| 2024/0010030 | A1* | 1/2024 | Noguchi | C08L 9/00 |

FOREIGN PATENT DOCUMENTS

| | | | | |
|---|---|---|---|---|
| JP | H08333483 | A | 12/1996 | |
| JP | 2004346220 | A | 12/2004 | |
| JP | 2005075952 | A | 3/2005 | |
| JP | 2005133017 | A | 5/2005 | |
| JP | 2007186550 | A | 7/2007 | |
| JP | 4081182 | B2 | 4/2008 | |
| JP | 2009127001 | A | 6/2009 | |
| JP | 5101830 | B2 | 12/2012 | |
| WO | 2014003052 | A1 | 1/2014 | |
| WO | WO-2022113722 | A1 * | 6/2022 | B60C 1/0025 |

OTHER PUBLICATIONS

Nov. 7, 2024, International Preliminary Report on Patentability issued in the International Patent Application No. PCT/JP2022/037631.

Dec. 20, 2022, International Search Report issued in the International Patent Application No. PCT/JP2022/037631.

* cited by examiner

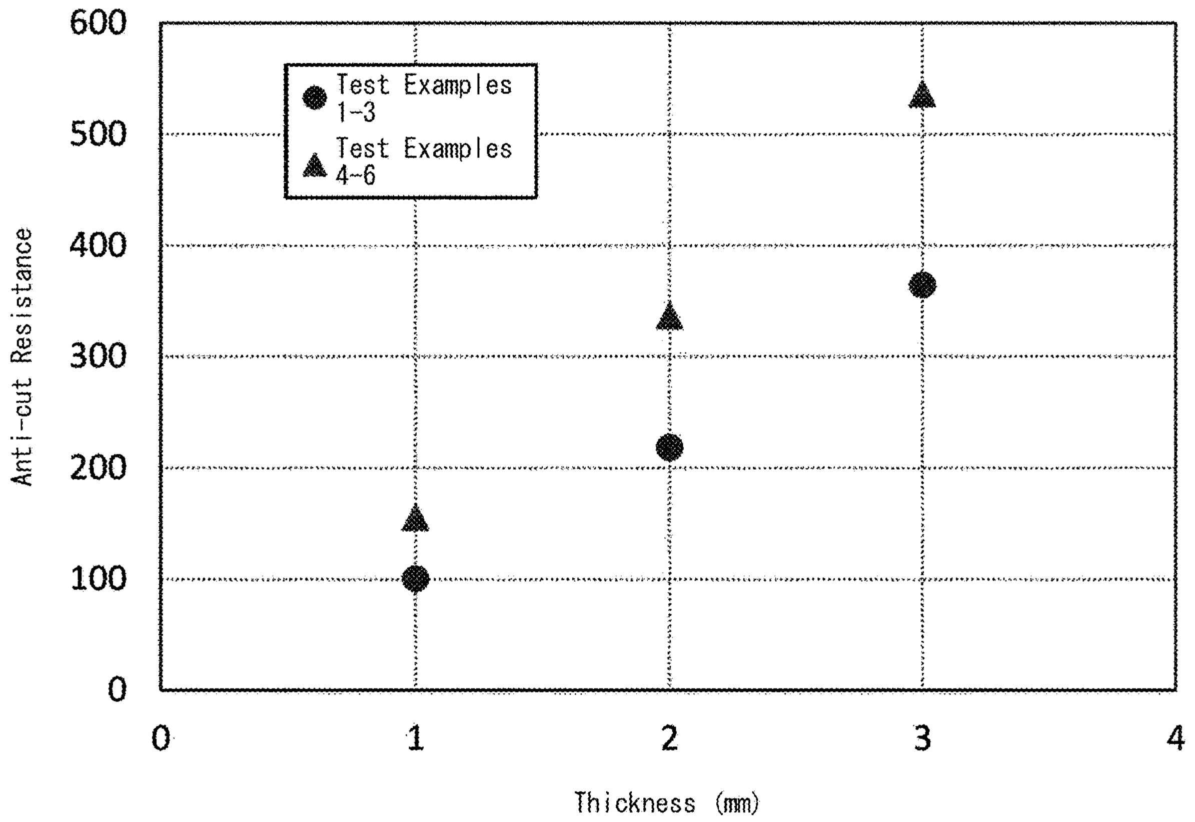
Test Examples 1-3
Test Examples 4~6
Anti-cut Resistance
Thickness (mm)
0
100
200
300
400
500
600
0
1
2
3
4

RUBBER ARTICLE AND TIRE INCLUDING SAME

TECHNICAL FIELD

The present disclosure relates to a rubber article and a tire including same, particularly to a rubber article that can be applied to the side rubber of tires used in construction vehicles, mining vehicles, and the like.

BACKGROUND

Tires mounted on dump trucks and the like that travel on rocky mines or construction sites (referred to as ORR (off-the-road radial) tires) are prone to receive cut damages on the sidewall portion. Therefore, the side rubber applied to this sidewall portion is required to have a high anti-cut resistance.

In recent years, in order to achieve high fuel efficiency and weight reduction, efforts have been made to thin the gauge in ORR tires. However, there is a tendency for the anti-cut resistance tends to decrease as the side rubber becomes thinner.

It has been known to use a rubber composition containing syndiotactic 1,2-polybutadiene to improve the anti-cut resistance (see PTL 1, etc.).

CITATION LIST

Patent Literature

PTL 1: JP H07-062153 A

SUMMARY

Technical Problem

However, merely blending syndiotactic 1,2-polybutadiene does not provide sufficient improvement in anti-cut resistance, and there remains room for further enhancement, particularly in achieving this simultaneously with a low heat generating property. Therefore, it has been challenging to achieve both low heat generating property and high anti-cut resistance simultaneously.

The present disclosure has been conceived of in view of the above problem, and an object thereof is to provide a rubber article that can achieve excellent low heat generating property and anti-cut resistance simultaneously, and a tire including such a rubber article.

Solution to Problem

To address the above problem, the present disclosure provides the following [1] to [5].

[1] A rubber article, the rubber article being a vulcanizate of a rubber composition comprising a rubber component and syndiotactic 1,2-polybutadiene, the rubber component comprising 30 mass % or more and 70 mass % or less of natural rubber and 30 mass % or more and 70 mass % or less of butadiene rubber, a proportion of the syndiotactic 1,2-polybutadiene being 5 parts by mass or more and 40 parts by mass or less per 100 parts by mass of the rubber component, and a thickness being 3 mm or more.

[2] The rubber article according to [1], wherein the proportion of the syndiotactic 1,2-polybutadiene is 22 parts by mass or more and 30 parts by mass or less per 100 parts by mass of the rubber component.

[3] The rubber article according to [1] or [2], wherein a melting point of the syndiotactic 1,2-polybutadiene is 123 °C or lower.

[4] A tire comprising the rubber article according to any one of [1] to [3].

[5] The tire according to [4], wherein the rubber article is used as a side rubber.

Advantageous Effect

According to the present disclosure, a rubber article that can achieve both excellent low heat generating property and anti-cut resistance simultaneously can be obtained. Further, by applying the rubber article of the present disclosure, a tire that exhibits excellent low heat generating property and anti-cut resistance can be obtained.

BRIEF DESCRIPTION OF THE DRAWINGS

FIG. 1 A graph illustrating the relationship between the thickness and the anti-cut resistance of a rubber article.

DETAILED DESCRIPTION

Hereinafter, the present disclosure will be illustrated and explained in detail based on an embodiment thereof. In the following description, the description of a numerical range as "A to B" indicates a numerical range including the endpoints A and B, and represents "A or more and B or less" (when A<B) or "A or less and B or more" (when A>B).

Also, parts by mass and mass % are synonymous with parts by weight and weight %, respectively.

The compounds disclosed herein may be partially or completely derived from fossil resources, biological resources such as plant resources, or recyclable resources such as end-of-life tires. They may also be derived from mixtures of two or more fossil resources, biological resources and recyclable resources.

[Rubber Article]

A rubber article of the present disclosure is a vulcanizate of a rubber composition containing a rubber component and syndiotactic 1,2-polybutadiene, wherein the rubber component contains 30 mass % or more and 70 mass % or less of natural rubber and 30 mass % or more and 70 mass % or less of butadiene rubber, and the proportion of syndiotactic 1,2-polybutadiene is 5 parts by mass or more and 40 parts by mass or less per 100 parts by mass of the rubber component, and the thickness is 3 mm or more.

Since the rubber article of the present disclosure is a vulcanizate of the rubber composition containing the above-mentioned rubber component, it has excellent low heat generating property.

In general, as the thickness of a rubber article increases, the anti-cut resistance tends to improve. Also, when syndiotactic 1,2-polybutadiene is blended in a rubber composition, the anti-cut resistance of the resulting rubber article tends to improve. However, as a result of investigations by the present inventor, it was found that the improvement in anti-cut resistance achieved by increasing the thickness was more pronounced in rubber articles obtained from the above-mentioned rubber composition than in rubber compositions obtained from a rubber composition free of syndiotactic 1,2-polybutadiene. In other words, it was found that the rubber article obtained from the above-mentioned rubber composition exhibited both the effect of improvement in anti-cut resistance due to syndiotactic 1,2-polybutadiene and the effect of improvement in anti-cut resistance achieved by increasing the thickness of the rubber article. The reason for this is not clear, but it is hypothesized to be a synergistic effect of the balance between the amounts of the rubber component and syndiotactic 1,2-polybutadiene relative to the rubber component. In other words, the present disclosure provides a rubber article that is a vulcanizate of the above-mentioned rubber composition, with a thickness of 3 mm or more, which achieves excellent anti-cut resistance that surpasses what could be predicted from conventional knowledge.

[Rubber Composition]

The rubber composition used in the rubber article of the present disclosure will be described in detail below.

<Rubber Component>

The rubber composition contains a rubber component and syndiotactic 1,2-polybutadiene. The rubber component contains 30 mass % or more and 70 mass % or less of natural rubber and 30 mass % or more and 70 mass % or less of butadiene rubber. The type of the polybutadiene rubber is not particularly limited. For example, the polybutadiene rubber may be modified butadiene rubber or unmodified butadiene rubber.

When the amount of the natural rubber is set to 30 mass % or more in the rubber component, the anti-cut resistance and crack propagation resistance of the rubber article can be improved. From the viewpoint of anti-cut resistance and crack propagation resistance, the amount of the natural rubber is preferably 35 mass % or more, more preferably 40 mass % or more.

Further, when the amount of the natural rubber is set to 70 mass % or less in the rubber component, a rubber article with excellent low heat generating property can be obtained and the ozone resistance of the rubber article can be improved. From the viewpoint of low heat generating property and ozone resistance, the amount of the natural rubber is preferably 65 mass % or less, more preferably 60 mass % or less.

When the amount of the butadiene rubber is set to 30 mass % or more in the rubber component, the ozone resistance of the rubber article can be improved. From the viewpoint of ozone resistance, the amount of the butadiene rubber is preferably 35 mass % or more, more preferably 40 mass % or more.

Further, when the amount of the butadiene rubber is set to 70 mass % or less in the rubber component, the anti-cut resistance and crack propagation resistance of the rubber article can be improved. From the viewpoint of anti-cut resistance and crack propagation resistance, the amount of the butadiene rubber is preferably 65 mass % or less, more preferably 60 mass % or less.

In the present disclosure, the rubber composition may contain diene-based rubber other than natural rubber and butadiene rubber as long as the performances required for the rubber article of the present disclosure (low heat generating property and anti-cut resistance) are not impaired. Examples of other diene-based rubbers include polyisoprene rubber (IR), styrene-butadiene copolymer rubber (SBR), butyl rubber (IIR), ethylene-propylene-diene copolymer (EPDM), and acrylonitrile-butadiene copolymer (NBR). The amount of other diene-based rubber is preferably 40 mass % or less, more preferably 30 mass % or less, and even more preferably 20 mass % or less in the rubber component.

In the present disclosure, the rubber composition contains 5 parts by mass or more and 40 parts by mass or less of syndiotactic 1,2-polybutadiene per 100 parts by mass of the rubber component. If the amount of the syndiotactic 1,2-polybutadiene is less than 5 parts by mass, sufficient bonding is not formed in the vulcanized rubber, so that sufficient anti-cut resistance and low heat generating property cannot be obtained. On the other hand, if the amount of the syndiotactic 1,2-polybutadiene is more than 40 parts by mass, the flexibility of the rubber decreases. Accordingly, not only sufficient anti-cut resistance and low heat generating property are not provided, but also the crack propagation resistance is reduced, which is undesirable. From the viewpoint of achieving excellent low heat generating property and anti-cut resistance, the amount of the syndiotactic 1,2-polybutadiene is preferably 22 parts by mass or more and 30 parts by mass or less, more preferably 24 parts by mass or more and 28 parts by mass or less.

Generally, large tires such as ORR tires are vulcanized at relatively low temperatures (at 145 °C or lower). When the melting point of the syndiotactic 1,2-polybutadiene is lower than the vulcanization temperature, syndiotactic 1,2-polybutadiene tends to be uniformly dispersed in the rubber component during vulcanization. As a result, the physical properties of the vulcanized rubber product, particularly crack propagation resistance, can be improved. In view of the above-mentioned vulcanization temperature, the melting point of the syndiotactic 1,2-polybutadiene is preferably 123 °C or lower, more preferably 120 °C or lower. On the other hand, in view of the anti-cut resistance and heat generating property of the vulcanized rubber product, the melting point of the syndiotactic 1,2-polybutadiene is preferably 95 °C or higher, more preferably 100 °C or higher.

In the present disclosure, the melting point is defined as follows. A sample of the syndiotactic 1,2-polybutadiene is placed in a differential scanning calorimetry (DSC) device, the temperature is raised at a rate of 10 °C/minute, and the DSC curve is obtained. The melting peak temperature of the DSC curve is defined as the "melting point."

The weight average molecular weight (Mw) of the syndiotactic 1,2-polybutadiene is preferably 100,000 to 750,000, more preferably 120,000 to 750,000, and even more preferably 140,000 to 750,000. When the weight average molecular weight (Mw) is within any of the above-mentioned ranges, a rubber product with excellent anti-cut resistance and low heat generating property can be obtained and the workability becomes also favorable.

The weight average molecular weight (Mw) is determined by gel permeation chromatography (GPC) using polystyrene as the standard substance.

The crystallinity of the syndiotactic 1,2-polybutadiene is preferably 25% to 80%, more preferably 25% to 70%, and even more preferably 25% to 50%. By using syndiotactic 1,2-polybutadiene with the above crystallinity, it is possible to achieve both excellent anti-cut resistance and low heat generating property simultaneously.

The crystallinity is calculated from the density measured by the water displacement method, with the density of the 1,2-polybutadiene with 0% crystallinity assumed to be 0.889 $g/cm^3$ and the density of the 1,2-polybutadiene with 100% crystallinity assumed to be 0.963 $g/cm^3$.

The syndiotactic 1,2-polybutadiene preferably has a 1,2-bond content of 60 mass % or more, more preferably 70 mass % or more, and even more preferably 80 mass % or more.

The 1,2-bond content is determined by $^{1}H$ and $^{13}C$ nuclear magnetic resonance (NMR) analyses of the syndiotactic 1,2-polybutadiene.

Examples of syndiotactic 1,2-polybutadiene applicable to the present disclosure include "RB840" (melting point: 126 °C, crystallinity: 36%, 1,2-bond content: 94 mass %) and "RB830" (melting point: 105 °C, crystallinity: 29%, 1,2-bond content: 93 mass %) manufactured by JSR Corporation. Of these, "RB830" is particularly preferably used.

<Filler>

The rubber composition used in the present disclosure contains a filler for reinforcing the rubber composition. When a filler is added to the rubber composition, the strength, such as the breaking resistance, of the rubber product can be enhanced.

The rubber composition preferably contains carbon black as a filler. In addition to carbon black, the rubber composition of the present disclosure may also contain silica and an inorganic filler. Examples of the inorganic filler include clay, talc, calcium carbonate, and aluminum hydroxide.

<<Carbon Black>>

The carbon black used is not particularly limited, and examples include carbon blacks of GPF, FEF, HAF, ISAF, and SAF grades. These carbon blacks may be used alone or in combination of two or more types.

The nitrogen adsorption specific surface area ($N_2SA$, measured according to JIS K 6217-2:2001) of the carbon black is preferably 120 $m^2/g$ or less, more preferably 100 $m^2/g$ or less from the viewpoint of low heat generating property. From the viewpoint of durability, the nitrogen adsorption specific surface area of the carbon black is preferably 40 $m^2/g$ or more, more preferably 50 $m^2/g$ or more. Carbon blacks of the types mentioned above may be used alone or in combination with two or more.

The content of the carbon black is preferably 20 parts by mass or more, more preferably 25 parts by mass or more, and even more preferably 30 parts by mass or more per 100 parts by mass of the rubber component from the viewpoint of durability. From the viewpoint of heat generating property, the content of the carbon black is preferably 70 parts by mass or less, more preferably 60 parts by mass or less, and even more preferably 55 parts by mass or less.

<<Inorganic Filler>>

The rubber composition used in the present disclosure may contain an inorganic filler as necessary. Examples of the inorganic filler include silica, and at least one metal, metal oxide, or metal hydroxide selected from aluminum, magnesium, titanium, calcium, and zirconium. Among these, silica with high reinforcing properties is preferred. The type of silica is not particularly limited, and examples include wet silica (hydrated silica), dry silica (anhydrous silica), calcium silicate, aluminum silicate, and among these, wet silica is preferred. These types of silica may be used alone or in combination of two or more types.

When the rubber composition according to the present disclosure contains an inorganic filler including silica, a silane coupling agent may be added to further improve the reinforcing property and high fuel efficiency of the rubber composition.

The content of the inorganic filler is preferably 80 parts by mass or less, more preferably 75 parts by mass or less, and even more preferably 70 parts by mass or less per 100 parts by mass of the rubber component from the viewpoint of heat generating property.

<Various Components>

The rubber composition used in the present disclosure may contain, as necessary, various components commonly used in the rubber industry, such as stearic acid, antioxidants, zinc oxide, vulcanization accelerators, vulcanizing agents, resins, and oils, as long as the effects of the present disclosure are not impaired. Commercially available products can be suitably used as these various components.

[Applications of Rubber Article]

The rubber article of the present disclosure has an excellent low heat generating property and anti-cut resistance. The rubber article of the present disclosure can be applied to tires, conveyor belts, and the like.

Among these, it is particularly preferred that the rubber article of the present disclosure be applied to tires, more preferably to the side rubber of tires. Examples of tires to which the rubber article of the present disclosure is applied include tires for large vehicles, such as ORR (off-the-Road Radial) tires and truck tires. Among these, it is particularly preferred that the rubber article be applied to ORR tires.

The rubber article of the present disclosure must have a thickness of 3 mm or more. When the thickness is 3 mm or more, an excellent anti-cut resistance can be ensured, and by using the above-mentioned rubber composition, the improvement effect on anti-cut resistance exceeding expectations can be achieved. In view of anti-cut resistance, the thickness of the rubber article is preferably 4 mm or more, more preferably 5 mm or more.

When the rubber article of the present disclosure is applied to the side rubber of tires, the thickness of the thinnest part of the total gauge in the tire side portion is preferably 3 mm or more, more preferably 4 mm or more, and even more preferably 5 mm or more. It should be noted that as the thickness of the side rubber increases, there is a risk that the weight will increase, leading to worsened fuel efficiency, and the amount of rubber used will also increase. Therefore, from the viewpoint of weight reduction and reducing the amount of rubber used, the thickness of the side rubber is preferably 30 mm or less.

[Manufacturing Method of Rubber Article]

The rubber article of the present disclosure can be manufactured by the following method.

First, the above-mentioned components of the rubber composition are blended and kneaded to prepare the rubber composition. For kneading, a kneader such as a Banbury mixer, roll, or internal mixer can be used. The kneading of the components can be performed in one stage or divided into two or more stages.

Subsequently, the rubber composition is vulcanized to obtain the rubber article. In this case, the rubber composition may be molded and then vulcanized, or a semi-vulcanized rubber that has undergone a pre-vulcanization step may be molded and then fully vulcanized.

When the rubber article of the present disclosure is applied to a tire, the rubber article of the present disclosure is laminated with other rubber members to form a green tire, and the green tire is vulcanized to manufacture the tire. The vulcanization is preferably carried out at a vulcanization temperature of 100 to 145 °C.

EXAMPLES

Examples 1~4 and Comparative Example 1

The ingredients were kneaded according to the formulation listed in Table 1 below to prepare rubber compositions. The unit of the numerical values in the formulations in Table 1 is parts by mass. The prepared rubber compositions were vulcanized at 145 °C or 110 °C to obtain rubber articles of the examples and the comparative example. The details of the ingredients in the table are as follows:

NR: Natural rubber, TSR #20

BR: Butadiene rubber, VCR450, UBE Elastomer Co., Ltd.

sPB1: Syndiotactic 1,2-polybutadiene, trade name: "RB830" manufactured by JSR Corporation, melting point: 105 °C.

sPB2: Syndiotactic 1,2-polybutadiene, trade name: "RB840" manufactured by JSR Corporation, melting point: 126 °C.

Carbon black: HAF manufactured by Asahi Carbon Co., Ltd.

Sulfur (vulcanizing agent): HK-200-5 manufactured by Hosoi Chemical Industry Co., Ltd.

TBBS (vulcanization accelerator): N-(t-Butyl)-2-benzothiazolesulfenamide, trade name: "Sanseler NS-G" manufactured by Sanshin Chemical Industry Co., Ltd.

The following evaluations were conducted on the examples and comparative examples.

1. Heat Generating Property

The heat generating property was evaluated using the rubber articles vulcanized at 145 °C. Using a spectrometer manufactured by Ueshima Seisakusho Co., Ltd., tan δ (loss tangent) of each rubber article at 25 °C was measured under the conditions of an initial load of 1600 mN, strain of 2%, and frequency of 52 Hz. The heat generating property was expressed as an index, with the tan δ of the rubber article of Comparative Example 1 set to 100. The results are summarized in Table 1. The smaller the value, the better the low heat generating property.

2. Anti-Cut Resistance

The anti-cut resistance was evaluated using the rubber articles vulcanized at 145 °C.

Samples with a thickness of 5 cm, length of 15 cm, and width of 10 cm were cut from the rubber articles and placed on a horizontal platform. A blade with a weight of 26 kg was placed 40 cm above the sample with the blade edge facing the sample. The blade was then allowed to free-fall, creating a cut in the sample. After cutting the sample parallel to the cut, the depth of the cut was measured. The result was expressed as the anti-cut resistance index, with the reciprocal of the depth of the cut in the rubber article of Comparative Example 1 set to 100. The results are summarized in Table 1. The larger the value, the better the anti-cut resistance.

3. Crack Propagation Resistance

For Comparative Example 1 and Examples 2 and 4, two types of rubber articles were prepared: one vulcanized at 110 °C and the other vulcanized at 145 °C. JIS No. 3 test pieces were prepared from each rubber article. A crack of 0.5 mm was made in the center of the test piece in the length direction. Using a tensile testing machine (manufactured by Shimadzu Corporation), repeated stress was applied in the length direction of the test piece at an ambient temperature of 80 °C in a strain range of 0% to 70% until the test piece was broken. The results were expressed as an index, with the result of the test piece prepared from the rubber composition of Comparative Example 1 vulcanized at 145 °C set to 100. The results are summarized in Table 1. The larger the value, the better the crack propagation resistance.

TABLE 1

| | | Comp. Example 1 | Example 1 | Example 2 | Example 3 | Example 4 |
|---|---|---|---|---|---|---|
| NR | | 50 | 50 | 50 | 50 | 50 |
| BR | | 50 | 50 | 50 | 50 | 50 |
| sPB1 (melting point: 105° C.) | | 0 | 10 | 26 | 28 | 0 |
| sPB2 (melting point: 126° C.) | | 0 | 0 | 0 | 0 | 20 |
| Carbon Black | | 43 | 43 | 43 | 43 | 43 |
| Zinc Oxide | | 3 | 3 | 3 | 3 | 3 |
| Stearic Acid | | 2 | 2 | 2 | 2 | 2 |
| TBBS | | 0.7 | 0.7 | 0.7 | 0.7 | 0.7 |
| Sulfur | | 1.6 | 1.6 | 1.6 | 1.6 | 1.6 |
| Heat Generating Property | | 100 | 94 | 84 | 84 | 91 |
| Anti-cut Resistance | | 100 | 106 | 111 | 107 | 107 |
| Crack Propagation | vulcanizated at 110° C. | 116 | — | 206 | — | 109 |
| Resistance | vulcanizated at 145° C. | 100 | — | 1751 | — | 1180 |

As summarized in Table 1, the rubber articles with low heat generating property and excellent anti-cut resistance were obtained by adding syndiotactic 1,2-polybutadiene. In particular, Examples 2 and 3 exhibited better low heat generating property and anti-cut resistance compared to Example 1 or Example 4.

When the vulcanization temperature was set to 110 °C, Example 4 (with a melting point of syndiotactic 1,2-polybutadiene of 126 °C) did not provide sufficient crack propagation resistance. In contrast, in Example 2 (with a melting point of syndiotactic 1,2-polybutadiene of 105 °C), the crack propagation resistance improved compared to Comparative Example 1. Furthermore, when the vulcanization temperature was set to 145 °C, both Example 2 and Example 4 exhibited improved crack propagation resistance compared to Comparative Example 1. As described above, when the vulcanization temperature is higher than the melting point of the syndiotactic 1,2-polybutadiene, a further excellent crack propagation resistance was achieved.

Test Examples 1-6

The ingredients were kneaded according to the formulation listed in Table 2 below to prepare rubber compositions. The unit of the numerical values in the formulation in the table is parts by mass. The prepared rubber compositions were vulcanized at 145 °C to obtain the rubber articles of Test Examples 1-6. The thickness of the rubber articles in each test example is listed in Table 2.

The details of the ingredients in the table are as follows:

NR: Natural rubber, RSS #1 sPB2: Syndiotactic 1,2-polybutadiene, trade name: "RB840" manufactured by JSR Corporation, melting point: 126 °C Carbon Black: HAF grade, $N_2SA$: 66 $m^2/g$, DBP: 103 ml/100 g Sulfur (vulcanizing agent): HK-200-5 manufactured by Hosoi Chemical Industry Co., Ltd.

CZ (vulcanization accelerator): N-Cyclohexyl-2-benzothiazole sulfenamide, trade name: "Nocceler CZ" manufactured by Ouchi Shinko Chemical Industrial Co., Ltd.

The following evaluation of the anti-cut resistance was conducted for each test example.

Samples with a length of 7 cm and a width of 6 cm were cut from the rubber articles of each test example and placed on a horizontal platform. A blade with a weight of 15 kg was placed above the sample with the blade edge facing the rubber article. The blade was then allowed to free-fall, creating a cut in the sample. The test was conducted while varying the height from which the blade was dropped, and the height at which the sample broke was recorded. Using the obtained height values, the energy required to break the rubber article was calculated. The anti-cut resistance was expressed as an index, with the energy required to break the rubber article of Test Example 1 set to 100. The results are summarized in Table 2. The larger the value, the better the anti-cut resistance.

Furthermore, the relationship between the thickness of the rubber articles and the anti-cut resistance values is illustrated in FIG. 1. In FIG. 1, the horizontal axis represents thickness, and the vertical axis represents the anti-cut resistance index.

to the contribution of the ingredients of the rubber composition when the thickness is 3 mm or more.

The trend illustrated in Table 2 and FIG. 1 is also expected to appear when using a rubber composition that further contains polybutadiene in the rubber component and satisfies the formulation ratio of the present application. Additionally, the trend illustrated in Table 2 and FIG. 1 is affected by the bond content of syndiotactic 1,2-polybutadiene in the vulcanized rubber. Therefore, it can be considered that the same trend will be observed when a different type of syndiotactic 1,2-polybutadiene than the one listed in Table 2 is used.

The invention claimed is:

1. A rubber article, the rubber article being a vulcanizate of a rubber composition comprising a rubber component and syndiotactic 1,2-polybutadiene, the rubber component comprising 30 mass % or more and 70 mass % or less of natural rubber and 30 mass % or more and 70 mass % or less of butadiene rubber,

TABLE 2

| | Test Example 1 | Test Example 2 | Test Example 3 | Test Example 4 | Test Example 5 | Test Example 6 |
|---|---|---|---|---|---|---|
| NR | 100 | 100 | 100 | 100 | 100 | 100 |
| sPB2 | 0 | 0 | 0 | 20 | 20 | 20 |
| Carbon Black | 50 | 50 | 50 | 50 | 50 | 50 |
| Accelerator (CZ) | 1.4 | 1.4 | 1.4 | 1.4 | 1.4 | 1.4 |
| Sulfur | 1.2 | 1.2 | 1.2 | 1.2 | 1.2 | 1.2 |
| Thickness (mm) | 1 | 2 | 3 | 1 | 2 | 3 |
| Anti-cut Resistance | 100 | 218 | 364 | 155 | 336 | 536 |

When the thicknesses were the same, Test Examples 4 to 6, which contained syndiotactic 1,2-polybutadiene, had improved anti-cut resistance than Test Examples 1-3, which did not contain it. These results were consistent with the results of the above-mentioned examples.

As illustrated in FIG. 1, in all of Test Examples 1-3 and 4-6, the anti-cut resistance increased with increasing thickness. However, in Test Examples 4-6, as the thickness increased, the gap in the anti-cut resistance index between these and Test Examples 1-3 tended to grow larger. This suggests that when using a rubber composition containing syndiotactic 1,2-polybutadiene, the improvement in anti-cut resistance is not solely due to the increased thickness but also to the contribution of the ingredients per se of the rubber composition. It can be concluded that the rubber article can achieve the effect of improvement in anti-cut resistance due a proportion of the syndiotactic 1,2-polybutadiene being 22 parts by mass or more and 30 parts by mass or less per 100 parts by mass of the rubber component, a melting point of the syndiotactic 1,2-polybutadiene being 123 °C or lower, and a thickness being 3 mm or more.

2. The rubber article according to claim 1, wherein the proportion of the syndiotactic 1,2-polybutadiene is 24 parts by mass or more and 28 parts by mass or less per 100 parts by mass of the rubber component.

3. A tire comprising the rubber article according to claim 1.

4. The tire according to claim 3, wherein the rubber article is a side rubber.

5. A tire comprising the rubber article according to claim 2.

6. The tire according to claim 5, wherein the rubber article is a side rubber.

* * * * *